United States Patent [19]

Propst et al.

[11] 4,351,541

[45] Sep. 28, 1982

[54] VEHICLE TOWING SYSTEM

[75] Inventors: Robert L. Propst, Bellevue, Wash.; William B. Raftery, Grandville, Mich.

[73] Assignee: Herman Miller, Inc., Zeeland, Mich.

[21] Appl. No.: 143,907

[22] Filed: Apr. 25, 1980

[51] Int. Cl.³ ............................................. B60D 7/00
[52] U.S. Cl. .................................. 280/408; 105/4 R; 105/170; 220/23.4; 280/476 R
[58] Field of Search ................... 280/408, 489, 491 B, 280/515, 494, 62, 92, 96.3, 47, 37 R, 407, 411 R, 476 R; 16/18 R, 31 R; 220/1.5, 23.4; 105/170, 4 R; 180/146

[56] References Cited

U.S. PATENT DOCUMENTS 1,202,651 10/1916 Benson .................................. 280/62
1,481,002 1/1924 Ferris ..................................... 280/62

FOREIGN PATENT DOCUMENTS 67279 2/1958 France ................................ 280/408
272446 3/1949 Switzerland ...................... 280/489
1420393 1/1976 United Kingdom ............... 280/408

Primary Examiner—Joseph F. Peters, Jr.
Assistant Examiner—Mitchell J. Hill
Attorney, Agent, or Firm—Stephenson and Boller

[57] ABSTRACT

A system for towing a plurality of wheeled load-carrying vehicles in a train in which coacting tongue and pin members are provided on the vehicles. Each vehicle has a body having a front end and a back end, a pair of fixed position wheels secured to the underside of the body at the back end, a single caster wheel assembly secured to the underside adjacent the front end, and a tongue member mounted on the back end of the vehicle and having an opening in one end. The caster wheel assembly includes a flange secured to the wheel support and a downwardly extending towing pin on the outer end of the flange. To achieve tracking of a trailing vehicle behind a leading vehicle, the tongue on the leading vehicle is moved to a position in which the tongue opening receives the caster wheel pin on the trailing vehicle. A releasable connection is thus made, with the pulling force applied directly to the caster wheel support.

3 Claims, 7 Drawing Figures

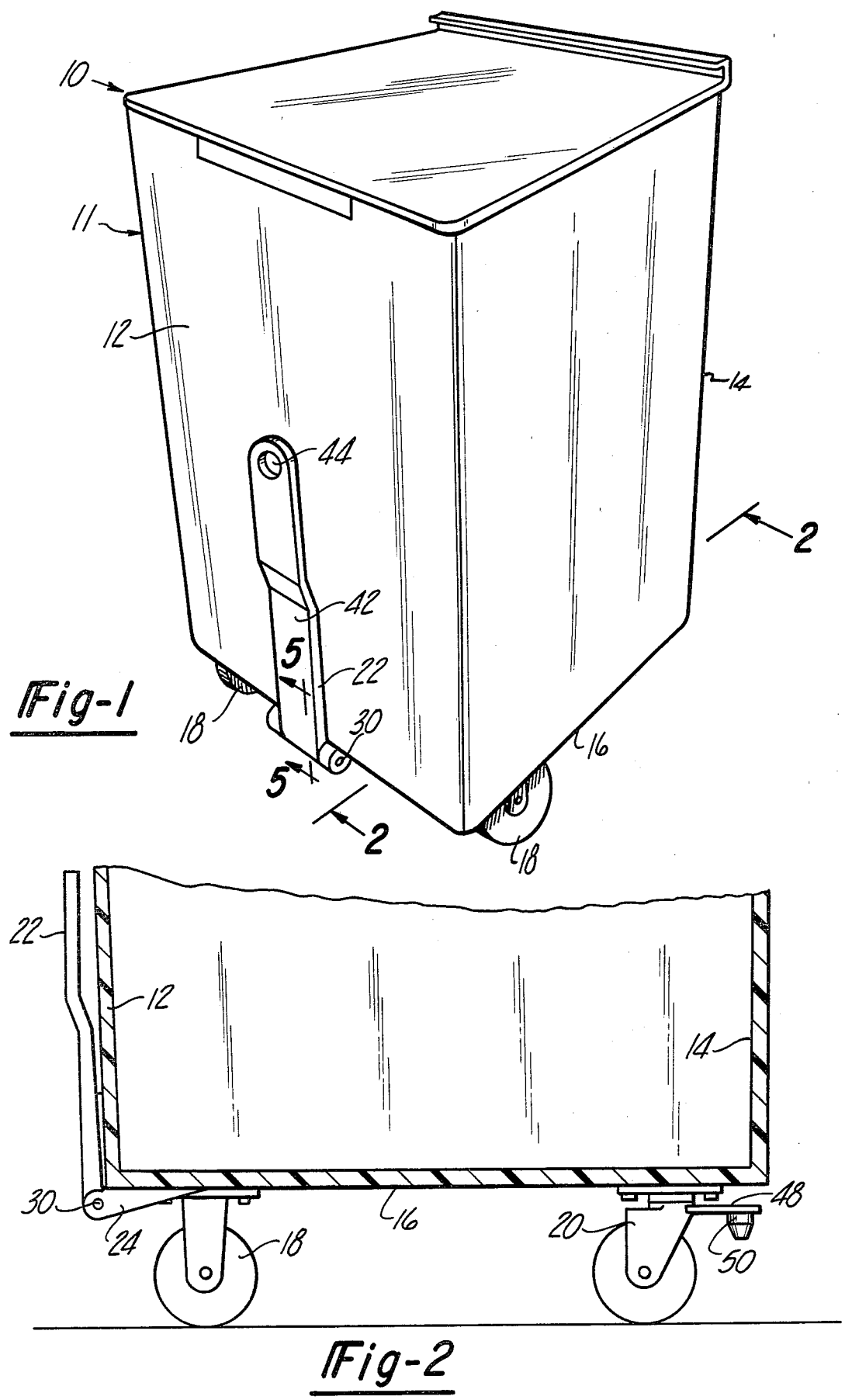

VEHICLE TOWING SYSTEM

BACKGROUND OF THE INVENTION

The present invention is an improvement on the vehicle towing system shown in U.S. Pat. No. 4,285,624 issued Aug. 25, 1981, assigned to the assignee of this application.

The above-mentioned application discloses a trash collection, management and disposal system utilizing wheeled load-carrying vehicles and a tongue-and-hitch system for towing vehicles. Each vehicle has a body, a pair of fixed-position wheels at the rear corners of the underside of the body, a pair of caster wheels at the front corners, a hitch pin secured to the underside between the caster wheels and a tongue rotatably mounted on the back of the body. A leading vehicle is hitched to a trailing vehicle by moving the tongue member to a position in which it is attached to the hitch pin. This arrangement has been found acceptable in every respect. The present invention provides an improved vehicle towing system which optimizes manufacturing and assembly expense while providing for accurate tracking of vehicles with a minimum of pulling force.

SUMMARY OF THE INVENTION

The present invention provides an improved load-carrying vehicle supported by three ground-engaging wheels. A pair of axially aligned, fixed-position wheels are mounted on the underside of the vehicle at the back end. A single caster wheel assembly is secured to the vehicle underside at the front end and provides for steering of the vehicle. Additionally, each vehicle is provided with a towing tongue having an opening at one end, the other end being pivotally mounted on the back of the vehicle. The tongue is movable between an upright stored position and a substantially horizontal towing position. Spring-loaded hinge means is provided to urge the tongue toward its stored position.

The caster wheel assembly comprises a conventional caster wheel provided with a tongue-engaging hitch portion which includes a substantially horizontal flange and a pin member extending downwardly therefrom. The pin has a cylindrical top portion of approximately the same diameter as the tongue opening and a tapered bottom portion of decreasing diameter. Thus, to pivotally connect a leading vehicle to a trailing vehicle to allow tracking of a train of vehicles in irregular paths and around corners, the tongue on the leading vehicle is first moved downwardly to a position in which the opening underlies the caster wheel pin on the trailing vehicle. The tongue is then allowed to spring up to its towing position in which the pin top portion substantially fills the tongue opening. The spring operates at this point to force the tongue against the caster wheel flange and thereby maintain the tongue in its towing position.

In the present invention, the pulling force exerted on the vehicle is applied directly to the steering mechanism, which is the single front caster wheel. As the leading vehicle turns, the tongue pivots the caster on the trailing vehicle; thus, the turning movement of the leading vehicle is transferred directly to the trailing vehicle. The wheel can therefore never be turned in the wrong direction or dragged across the ground. The system thus provides improved tracking of vehicles in a true path with a minimum of frictional resistance.

The present towing system optimizes manufacturing and assembly costs by employing only three support wheels. The hitch pin is fixed to the caster rather than to the vehicle body, thereby further decreasing costs and facilitating assembly.

Further objects, features and advantages of this invention will become apparent from a consideration of the following description, the appended claims and the accompanying drawing in which:

FIG. 1 is a perspective view of the load-carrying vehicle in the towing system of this invention;

FIG. 2 is a longitudinal sectional view of the lower portion of the vehicle of this invention, as seen from substantially the line 2—2 in FIG. 1;

Figure 3:
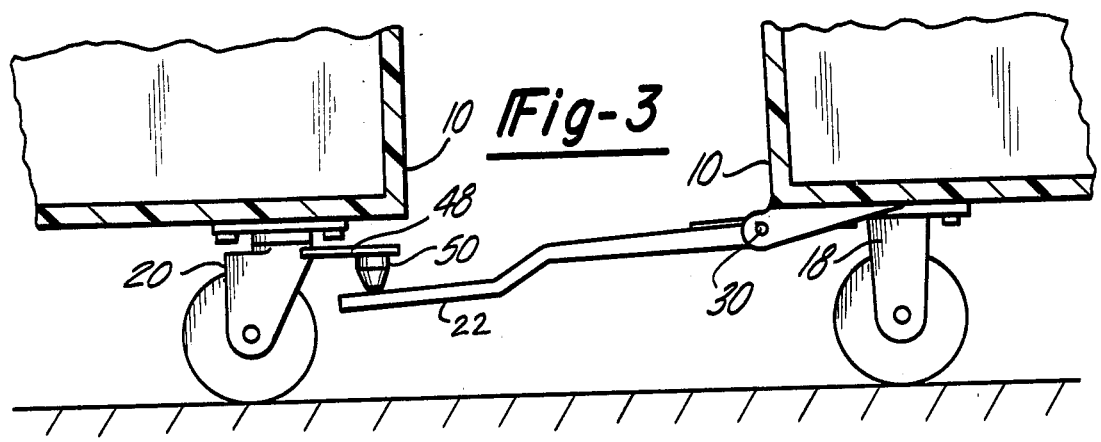
FIGS. 3 and 4 are vertical sectional views of the towing system of this invention, showing progressive movement of a tongue to a towing position engaging a hitch pin.

With reference to the drawing, the vehicle of this invention, indicated generally at 10, is shown in FIG. 1 as including a body 11 which has a back end 12, a front end 14, and a bottom wall 16. The body 11 is supported by a pair of fixed position wheels 18 and a single caster wheel assembly 20 (FIG. 2). As seen in FIGS. 1 and 2, the fixed wheels 18 are axially aligned and axially spaced, and are secured to the bottom wall 16 near the back end 12.

The caster wheel assembly 20 is secured to the bottom wall 16 near the front end 14 and is spaced between the sides of the body 11 so that the wheels 18 are equally spaced from the assembly 20 and all of the wheels assume substantially the positions of the wheels of a tricycle. The vehicle 10 is further provided with a tongue member 22 mounted on a hinge assembly 24 which is in turn secured to the back end 12 and bottom wall 16.

Figure 5:
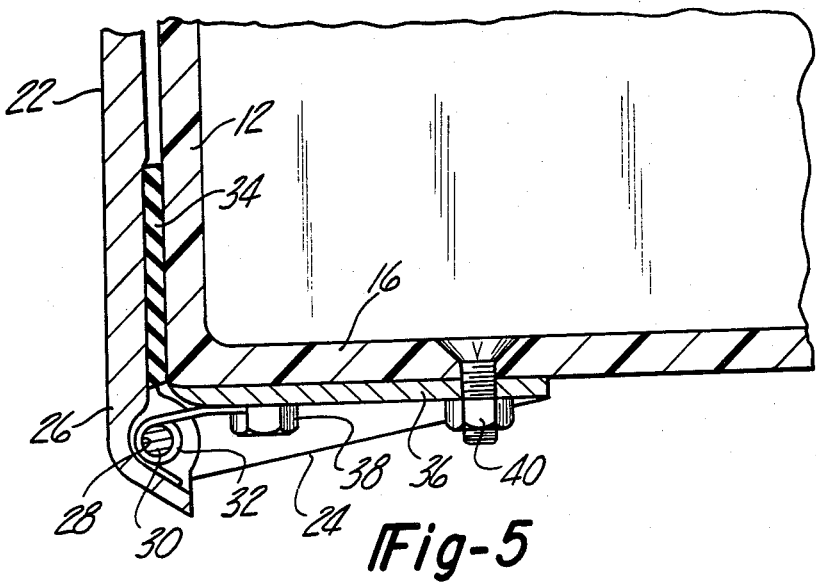
FIG. 5 is a detail sectional view of the towing tongue assembly in the towing system of this invention, as seen from substantially the line 5—5 in FIG. 1.

With reference now to FIG. 5, the tongue 22 has an inner end 26 in which an opening 28 is provided. The hinge assembly 24 includes a hinge bar 30 which is positioned in the tongue opening 28 so that the tongue 12 is free to rotate about the bar 30. Spring means 32 encircle the bar 30 at the end portions thereof and are located to urge the tongue 22 toward a rest position adjacent the back end 12. A protective pad 34 secured to the tongue 22 cushions impact of the tongue 22 against the back end 12. The hinge assembly 24 also includes a mounting plate 36 which is secured to the bottom wall 16 by means of screws 38 and nut and bolt assemblies 40. The tongue 22 (FIGS. 1 and 6) has an outer end portion 42 provided with an opening 44 which serves a purpose to be explained presently.

Figure 6:
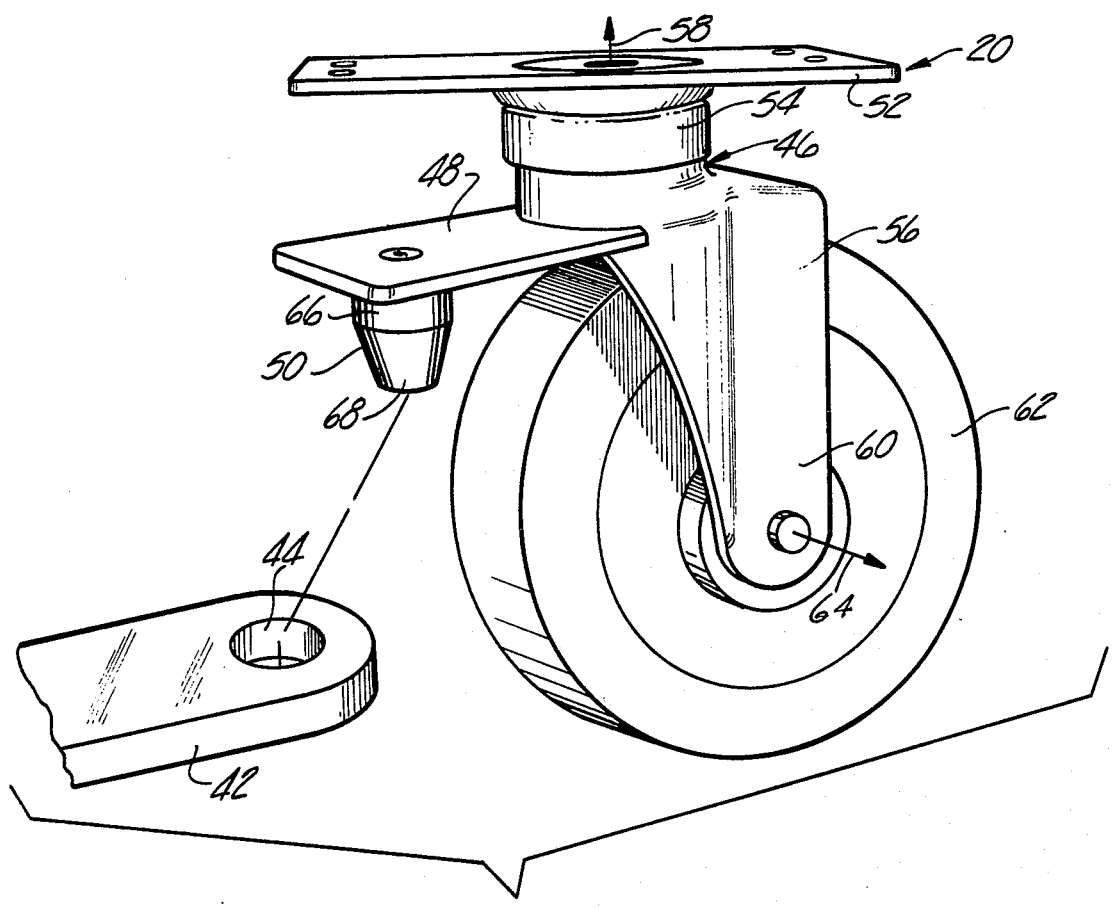
FIG. 6 is a perspective view of a caster wheel assembly in the system of this invention, showing a tongue end portion to be connected to the towing pin on the caster wheel assembly.

The caster wheel assembly 20 is seen in FIG. 6 as comprising a conventional caster wheel support member 46 having a forwardly extending flange 48 and a depending wheel support portion 56. A hitch pin 50 is secured to and extends downwardly from the front end of the flange 48. A mounting bracket 52 secured to the bottom wall 16 supports a tubular casing 54 at the upper end of the member 46 so that the member 46 can swivel about a vertical axis 58. The wheel support portion 56 includes a pair of legs 60 between which a wheel 62 is positioned for rotation about a horizontal axis 64. The flange 48 extends substantially horizontally and is secured to the wheel support 56 by conventional means such as welding or is made integral with the wheel support 56 so that the flange 48 swivels with the wheel support 56 about the vertical axis 58. The flange 48 is positioned so that it extends forwardly when the vehicle 10 is moving forward. The hitch pin 50 extends downwardly from the flange 48 and has a top portion 66 which has a diameter slightly less than the diameter of the tongue opening 44 so that the pin 50 fits tightly in the opening 44. A tapered bottom portion 68 on the pin 50 is provided to facilitate positioning of the tongue 22 on the pin 50.

Figure 4:
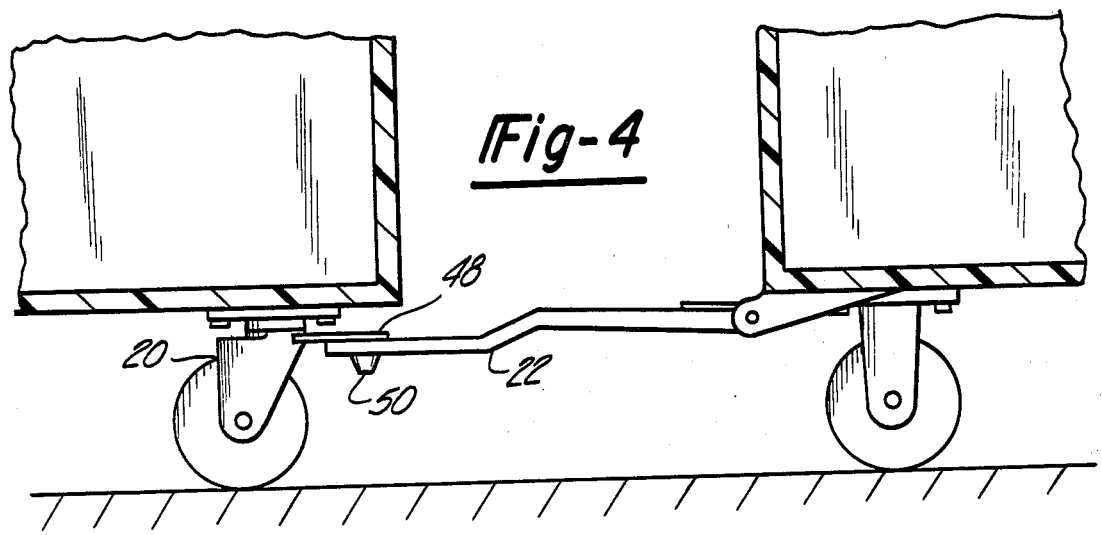

The tongue 22 is movable about the hinge bar 30 between an upright stored position, as seen in FIG. 1, and a substantially horizontal towing position, as seen in FIGS. 3 and 4. To connect a leading vehicle 10 to a following vehicle 10, the tongue 22 on the leading vehicle is pivoted downwardly and the leading vehicle is moved toward the trailing vehicle so that the tongue 22 underlies the pin 50 on the trailing vehicle, as seen in FIG. 3. The tongue 22 then moves upwardly so that the opening 44 receives the pin 50 (FIG. 4). In this position, the hinge springs 32 operate to force the tongue 22 toward the flange 48 so as to maintain the two vehicles in a connected relation. To release the tongue 22 from engagement with the pin 50, the tongue 22 is simply pushed downwardly and the leading vehicle moved forwardly. The terms "leading" and "trailing" as used herein are for illustrative purposes only, since the vehicles are identical and in most uses, a vehicle 10 serves as both a leading and trailing vehicle.

Figure 7:
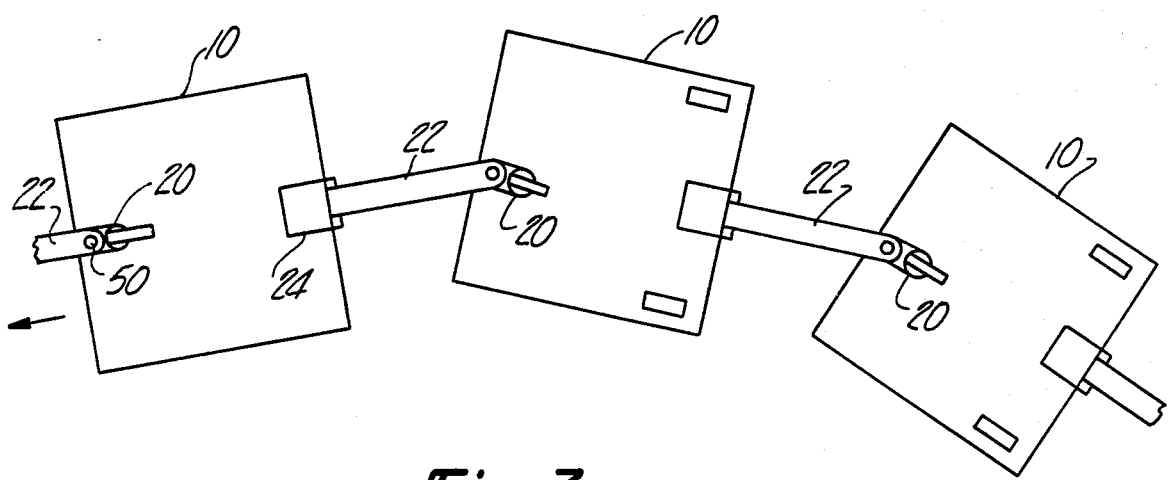
FIG. 7 is a diagrammatic plan view of the towing system of this invention showing a plurality of vehicles moving in a turning path.

As illustrated in FIG. 7, when a train of vehicles 10 moves in a turning path, each vehicle exerts a pulling force on the vehicle directly behind it. The pulling force is transmitted through the tongue 22 to a pin 50 and thus directly to the steering mechanism of each vehicle 10. As a leading vehicle 10 turns, its tongue 22 also turns the caster assembly 20 on the trailing vehicle. Movement of the assembly 20 causes the caster wheel support 46 to rotate about the vertical axis 58 and bring the wheel 62 to a new position wherein it guides the trailing vehicle 10 along the same path as the leading vehicle 10.

The invention thus provides a load-carrying vehicle 10 and improved means for towing a train of vehicles. The towing means includes tongues 22 mounted on each vehicle 10 and improved caster wheel assemblies 20 having hitch pins 50 secured thereto which cooperate with the tongues 22 on adjacent vehicles 10 to provide releasable pivotal connections between pairs of adjacent vehicles in a train. The pulling and turning forces on each vehicle 10 are applied directly to the caster wheel assembly 20 which steers the vehicle so that the present system thus provides for efficient and responsive tracking of a train of vehicles with a minimum of pulling force. The invention also optimizes assembly and manufacturing costs since the system utilizes only one caster wheel assembly 20 and the hitch pin 50 is secured to the caster wheel support member rather than to the vehicle body 11.

What is claimed is:

1. A wheeled vehicle adapted to be incorporated in a train of vehicles in which some vehicles are trailing vehicles with respect to some of the other vehicles and leading vehicles with respect to some of the other vehicles, said vehicle comprising a load-supporting body having a front end and a back end, a pair of axially aligned and axially spaced wheels fixed to the underside of said body adjacent said back end, a caster wheel assembly secured to the underside of said body adjacent said front end, coacting means on said body and said caster wheel assembly operable to releasably connect a trailing vehicle to an identical leading vehicle so that movement of said leading vehicle exerts a pulling force on said trailing vehicle applied at said caster wheel assembly, said coacting means comprising a mounting bracket secured to the underside of said body, a wheel support member mounted for swivelling movement about an upright axis on said bracket, a caster wheel rotatably mounted on said support member, a forwardly extending flange on said wheel support member located above said caster wheel, a pin member extending downwardly from said flange adjacent the front end thereof, and a tongue member pivotally mounted on said vehicle back end having an opening at one end thereof, said tongue on a leading vehicle being movable between an upright stored position and a towing position wherein said opening in the tongue receives said caster wheel pin member on a trailing vehicle for applying said pulling force to the trailing vehicle and wherein said leading vehicle tongue is mounted on the leading vehicle by spring-loaded hinge means urging said leading vehicle tongue toward said upright position so that its coupling to the trailing vehicle is effected and maintained by the tongue opening being forceably urged onto the trailing vehicle pin member and the tongue against said flange.

2. The wheeled vehicle according to claim 1 wherein said caster wheel pin includes a downwardly and inwardly tapered bottom portion.

3. A wheeled vehicle adapted to be incorporated in a train of vehicles in which some vehicles are trailing vehicles with respect to some of the other vehicles and leading vehicles with respect to some of the other vehicles, said vehicle comprising a load-supporting body having a front end and a back end, a pair of axially aligned and axially spaced wheels fixed to the underside of said body adjacent said back end, a caster wheel assembly secured to the underside of said body adjacent said front end, coacting means on said body and said caster wheel assembly operable to releasably connect a trailing vehicle to an identical leading vehicle so that movement of said leading vehicle exerts a pulling force on said trailing vehicle applied at said caster wheel assembly, said coacting means comprising a mounting bracket secured to the underside of said body, a wheel support member mounted for swivelling movement about an upright axis on said bracket, a caster wheel rotatably mounted on said support member, a forwardly extending flange on said wheel support member located above said caster wheel, a tongue member pivotally mounted on said vehicle back end, said tongue on a leading vehicle being movable between an upright stored position and a towing position wherein the end of the tongue is connected to said flange of the trailing vehicle for applying said pulling force to the trailing vehicle, said connection of the tongue to the flange comprising an opening within which a pin member is disposed, and wherein said leading vehicle tongue is mounted on the leading vehicle by spring-loaded hinge means urging said leading vehicle tongue toward said upright position so that its coupling to the trailing vehicle is effected and maintained by the tongue being forceably urged upwardly against said flange with the pin member passing through said opening.

* * * * *